United States Patent [19]
Yoshida

[11] Patent Number: 5,649,249
[45] Date of Patent: Jul. 15, 1997

[54] CAMERA WITH EXPOSED FRAME DETECTOR

[75] Inventor: Yutaka Yoshida, Saitama, Japan

[73] Assignee: Fuji Photo Film Co., Ltd., Kanagawa, Japan

[21] Appl. No.: 352,676

[22] Filed: Nov. 30, 1994

Related U.S. Application Data

[63] Continuation of Ser. No. 100,321, Aug. 2, 1993, abandoned.

[30] Foreign Application Priority Data

Jul. 31, 1992 [JP] Japan ................... 4-205690

[51] Int. Cl.⁶ .................................................. G03B 17/24
[52] U.S. Cl. ................................................. 396/319
[58] Field of Search ........................... 354/21, 105, 106, 354/207, 212, 215, 217, 218, 173.1, 173.11; 360/46, 67; 396/310, 319, 320, 406

[56] References Cited

U.S. PATENT DOCUMENTS

| | | | |
|---|---|---|---|
| 4,325,092 | 4/1982 | Nethery et al. | 360/67 X |
| 4,834,306 | 5/1989 | Robertson et al. | 354/275 X |
| 4,864,332 | 9/1989 | Harvey | 354/21 |
| 4,878,075 | 10/1989 | Cannon | 354/173.1 |
| 4,996,549 | 2/1991 | Yamaguchi | 354/173.11 |
| 5,006,873 | 4/1991 | Wash | 354/106 |
| 5,017,326 | 5/1991 | Wash et al. | 354/207 |
| 5,174,519 | 12/1992 | Oi et al. | 354/375 X |
| 5,344,730 | 9/1994 | Kitamoto | 354/106 X |

*Primary Examiner*—Howard B. Blankenship
*Attorney, Agent, or Firm*—Young & Thompson

[57] ABSTRACT

A photographic film cartridge contains a photographic film having a magnetic recording layer and a single perforation per frame. The leader of the photographic film has multiple perforations and is advanced out of the cartridge as the film spool rotates. A camera has a magnetic head disposed on a film passage, and a film sensor. The magnetic head records photographic information on the magnetic recording layer in a magnetic area assigned to each frame, while the photographic film is moved lengthwise after a frame is exposed. The film sensor detects the corresponding single perforation to identify each frame. When a photographic film cartridge containing the photographic film with exposed and unexposed frames is reloaded in the camera, the magnetic head picks up the information recorded on the magnetic recording layer to check for the presence or absence of the information. From the mere presence of recorded information and a signal from the film sensor, the next-usable unexposed frame, following the last exposed frame, is detected and positioned in the exposure position. A partially exposed roll of film can thus be completely rewound into the cartridge, and later re-inserted into the camera, whereupon special cartridge structure ensures that the film leader will exit the cartridge and that its multiple perforations will be engaged by the film take-up spool.

10 Claims, 15 Drawing Sheets

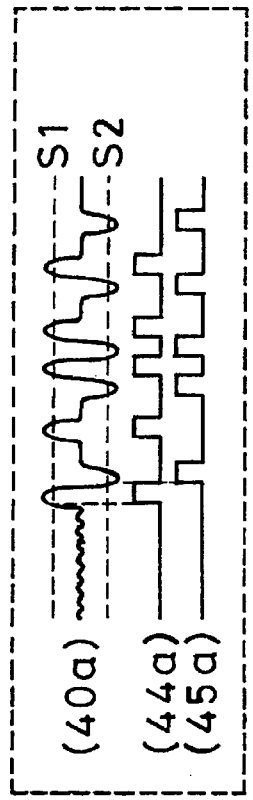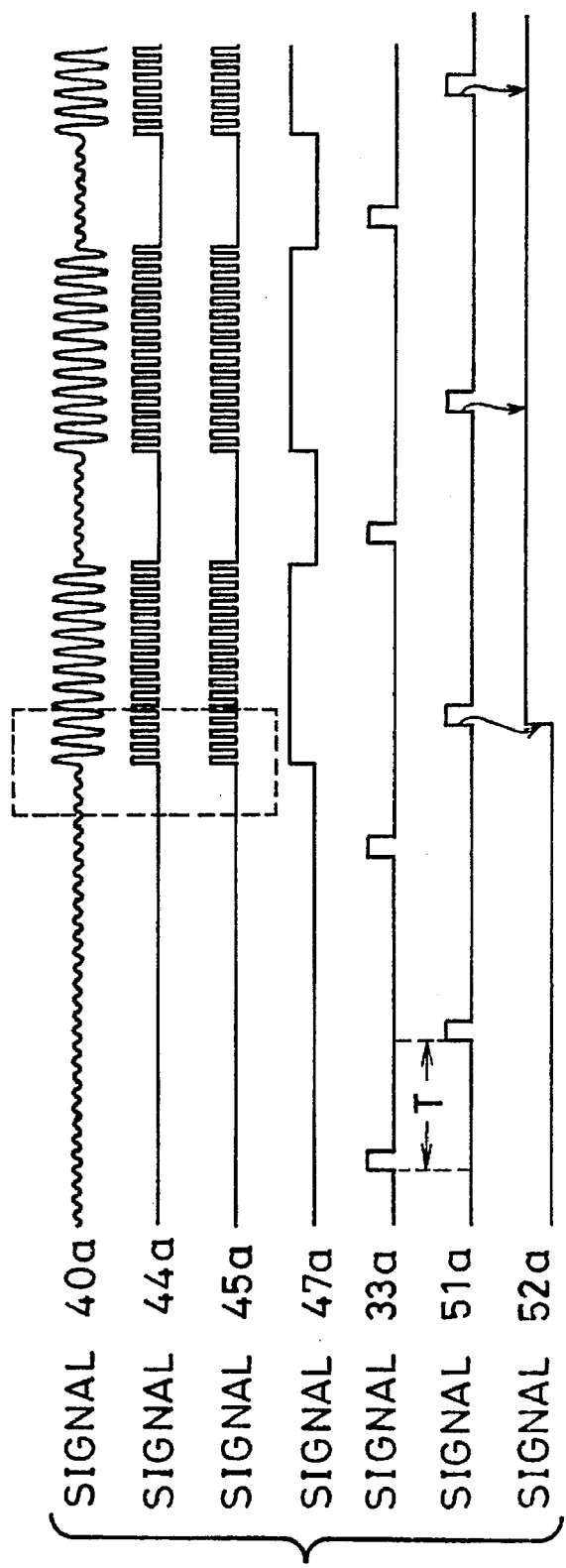

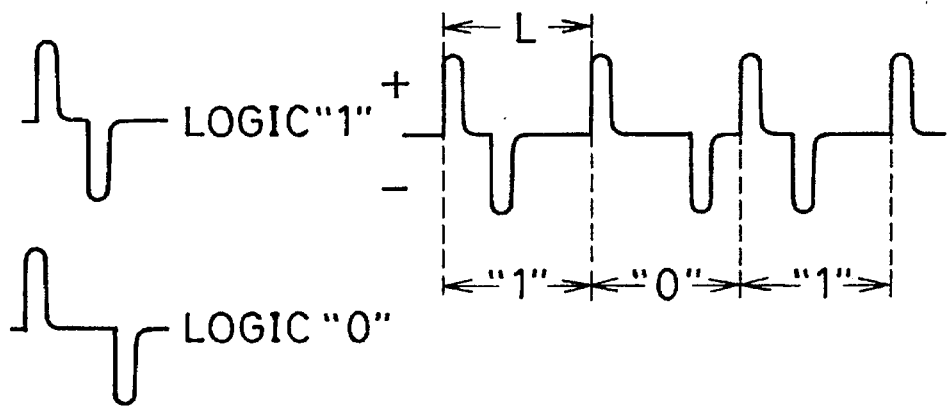
FIG. 15 A
FIG. 15 B
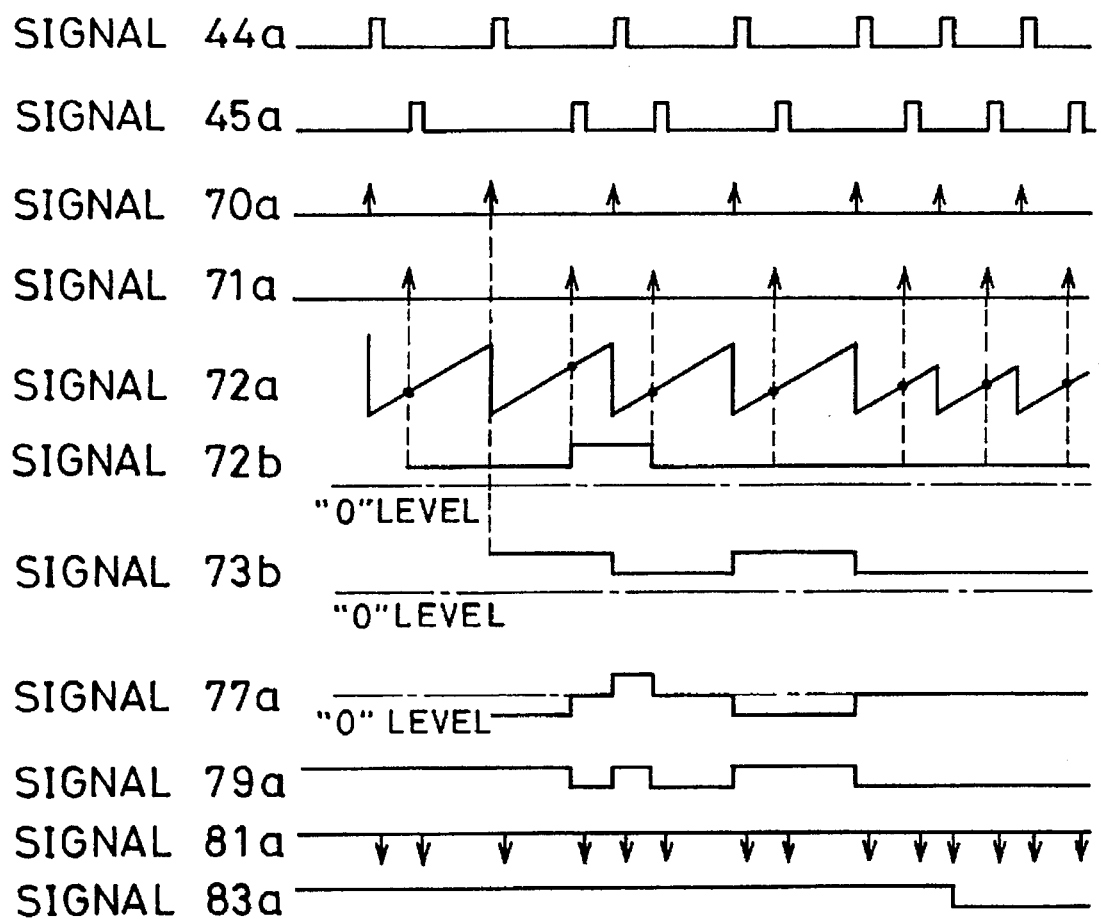
FIG. 16

5,649,249

CAMERA WITH EXPOSED FRAME DETECTOR

This application is a continuation of application Ser. No. 08/100,321, filed Aug. 2, 1993, now abandoned.

BACKGROUND OF THE INVENTION

1. Field of the Invention

The present invention relates to a camera capable of discriminating between an exposed film frame and an unexposed frame on the basis of information magnetically recorded on an area assigned to each imaging frame. More particularly, the present invention relates to a camera capable of detecting the unexposed frame next to the last exposed frame when a partially used photographic film is wound back into its cartridge, the cartridge containing both exposed and unexposed film is removed from the camera and is subsequently reloaded into the camera, and the film is advanced out of the cartridge, automatically to locate the detected next unexposed frame in the exposure position, so that photography with the same roll of film can be resumed with no waste.

2. Description of the Related Art

Photographic film cartridges are described in U.S. Pat. Nos. 4,834,306 and 5,174,519 (corresponding to Japanese Patent Laid-Open Publn. No. 2-124564), in which the film roll of an unused photographic film cartridge of this type is completely accommodated within the cartridge. To begin using the photographic film, the film spool is rotated to advance the leader of the photographic film via the film passage outside the cartridge. It is thus not necessary to manipulate the film leader before the cartridge is loaded into the camera. Another photographic film cartridge of a self-advance type is also known in which the film with a magnetic recording layer is contained in the cartridge. Photographic information and film information are recorded by a magnetic head on the magnetic recording layer of an exposed frame while the film is advanced by one frame. The photographic information includes the exposure value, the print format, the date of exposure, and the like, and the film information includes the ISO speed, emulsion data, and the like.

Another type of camera capable of reloading a partially used photographic film in a cartridge is also shown as described in U.S. Pat. No. 4,864,332. The photographic film cartridge for this camera has a film leader advance function and contains the film whose leader is formed with a magnetic recording area. When the film having unexposed frames is rewound into the cartridge, information as to the position of the unexposed frame next to the last exposed frame is written by a magnetic head on the magnetic recording area to allow the unexposed frames to be used later. When this cartridge is reloaded into the camera, the frame position information is read by the magnetic head, and the next available unexposed frame is automatically located in the exposure position. Because the photographic film cartridge used with this camera can be removed and reloaded before all frames have been exposed, it is possible to use the photographic film without loss of frames.

Generally speaking, information can be magnetically recorded relatively easily, but reading magnetically recorded information is difficult. To reliably read magnetically recorded information, it is necessary to use a device for detecting the speed of film advance with high precision and to provide a reproducing circuit including an amplifier for amplifying weak signals detected by a magnetic head at a high S/N ratio. Such a device and circuit for reliably reading magnetically recorded information complicate the structure of a camera and make it expensive, and are not suitable for amateur cameras. It is difficult to provide a camera suitable for use by amateurs which is capable of reloading a partially used photographic film and resuming photography starting with the unexposed frame next to the last exposed frame.

OBJECTS OF THE INVENTION

It is a principal object of the present invention to provide a camera with a simple structure capable of discriminating between an exposed frame and an unexposed frame without using a complicated and expensive reproducing circuit for correctly reading magnetic information.

It is another object of the present invention to provide a camera capable of reliably detecting the last exposed frame while the film of the reloaded photographic film cartridge is advanced, thereby to permit setting the unexposed frame next to the last exposed frame in the exposure position.

SUMMARY OF THE INVENTION

In order to achieve the above and other objects, the camera of this invention is equipped with monitoring means for monitoring a signal picked up by a magnetic head while the film is advanced. The monitoring means discriminates between an exposed frame and an unexposed frame by judging whether a recorded magnetic area was formed in the area corresponding to the exposed frame, irrespective of the contents of the recorded information. On the basis of a signal from the monitoring means and a signal from a film sensor detecting a one-frame advance of the film, the unexposed frame next to the last exposed frame is detected and automatically set in the exposure position.

According to the present invention, a simple check is performed to determine whether magnetically recorded information is or is not present, instead of reading what is represented by the magnetically recorded information. It is not necessary to use an expensive reproducing circuit for reading information precisely. Furthermore, it is not necessary to use a low noise amplifier circuit and high precision encoder, thereby simplifying the structure. The invention is also applicable to a general use camera having a single magnetic head for writing.

BRIEF DESCRIPTION OF THE DRAWINGS

The above and other objects and advantages of the present invention will become apparent from the detailed description of the preferred embodiments when read in conjunction with the accompanying drawings, in which:

FIG. 8a is a timing chart explaining the operation of the circuit shown in FIG. 5;

FIG. 8b is an enlarged view of the fragment of FIG. 8a that is enclosed in a dashed rectangle;

FIGS. 15A and 15B illustrate a three-bit code system;

FIG. 16 is a timing chart explaining the operation of the circuit shown in FIG. 14;

DETAILED DESCRIPTION OF THE PREFERRED EMBODIMENTS

Figure 1:
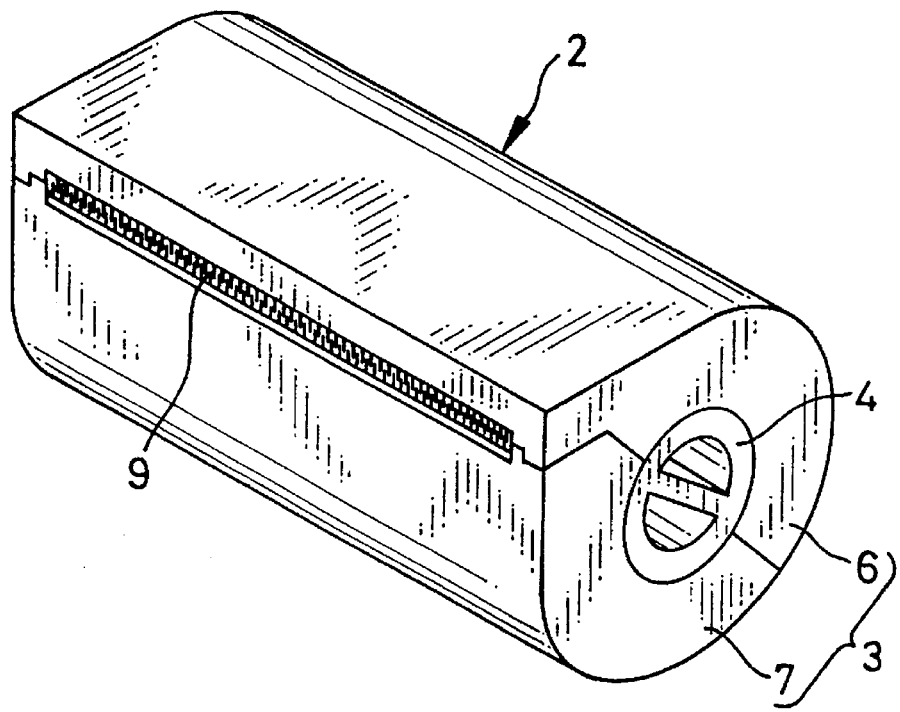
FIG. 1 is a perspective view showing an example of a photographic film cartridge to be loaded in a camera of the present invention.
Figure 2:
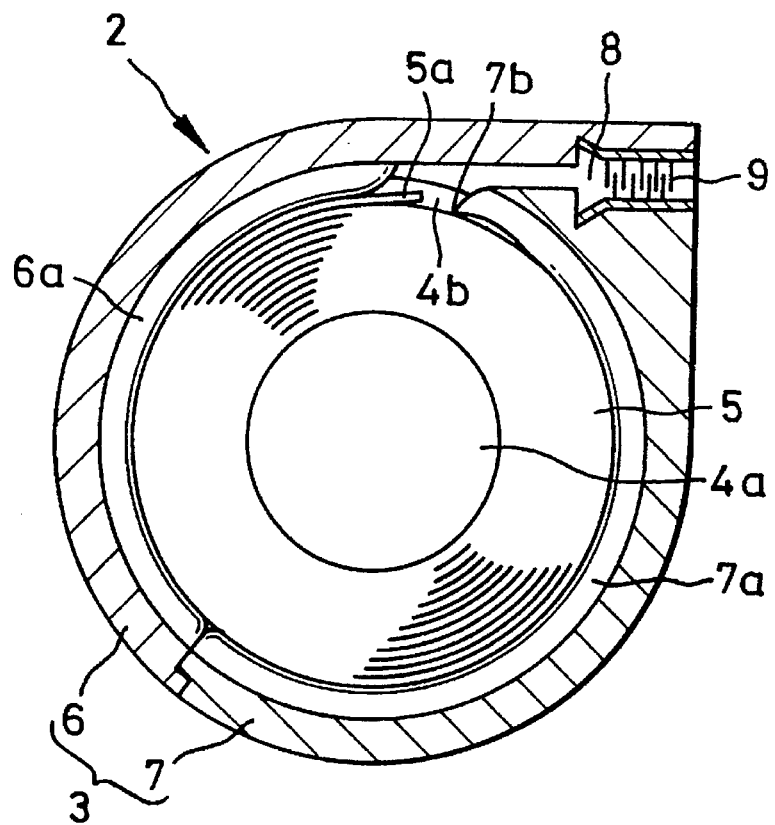
FIG. 2 is a cross section of the photographic film cartridge shown in FIG. 1.

Referring to FIGS. 1 and 2, a photographic film cartridge 2 is constituted by a cartridge 3, a spool 4, and a photographic film 5. The cartridge 3 and spool 4 are made of plastic. The cartridge 3 is made of two shell halves 6 and 7 joined together, with the spool 4 being freely rotatable in the cartridge 3. The cartridge 3 is formed with a film passage 8 through which the photographic film 5 passes. A light trap 9 is mounted in the film passage 8. The spool 4 comprises a spool core 4a and a pair of flanges. The photographic film 5 is wound about the spool core 4a with the end of the film 5 being fixed to the spool core 4a. The spool flanges make the opposite sides of the film roll even. Two rings ridges 6a and 7a are formed within the shell halves 6 and 7 at positions spaced between the spool flanges. The ridges 6a and 7a press on the outermost turn of the photographic film 5 to prevent it from loosening. One of the ridges 7a is formed with a separation claw 7b for separating the leader 5a of the film 5 from the roll and guiding it to the film passage 8.

The film leader 5a is fully located within the cartridge 3 before and after it is loaded in a camera. When the spool 4 is rotated, the film roll also rotates. During this rotation, the film leader 5a is peeled off from the roll by the separation claw 7b and advanced via the film passage 8 to the outside of the cartridge 3. The spool flanges and the ridges 6a and 7a clamp the film roll and prevent it from loosening during the advance of the film leader 5a.

Figure 3:
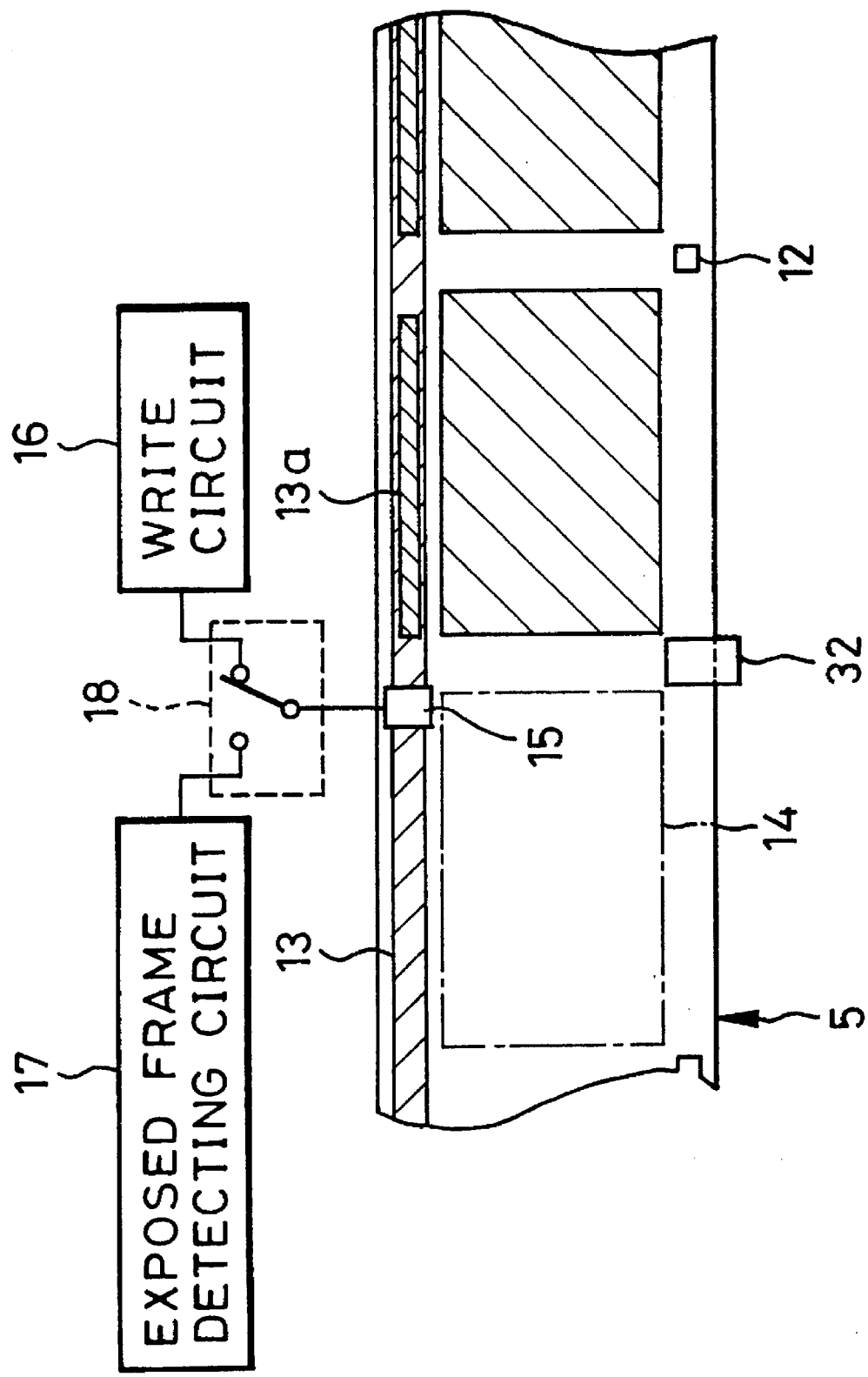
FIG. 3 is a plan view of a fragment of a photographic film showing the recordation on a magnetic recording layer.

Referring to FIG. 3, the photographic film 5 is formed with one perforation 12 per one frame. The frame advance operation of the camera is controlled by detecting the perforation 12. A magnetic recording layer 13 of a predetermined width is formed on the photographic film 5 lengthwise along one side. After a frame in the exposure aperture 14 is exposed, a one-frame advance takes place and at the same time a magnetic head 15 is driven by a write circuit 16 to magnetically write digital data on the magnetic recording layer 13. The digital data includes frame number information, ISO information, emulsion number information, exposure date information, exposure information, print format information, and the like. The area of the magnetic recording layer 13 on which this information is recorded constitutes a data-recorded magnetic area 13a.

Whether the frame has already been exposed or not can be judged from the presence or absence of the data-recorded magnetic area 13a along the upper edge of the frame. The already-exposed frames are shown by hatched lines in FIG. 3. This judgment can be made by inputting a signal from the write magnetic head 15 to an exposed frame detecting circuit or monitor circuit 17 of simple structure, without using a high quality read magnetic head. The magnetic head 15 is used for both reading and writing data, so that a selector 18 selectively connects the head 15 to one or the other of the write circuit 16 and the exposed frame detecting circuit 17.

Figure 4:
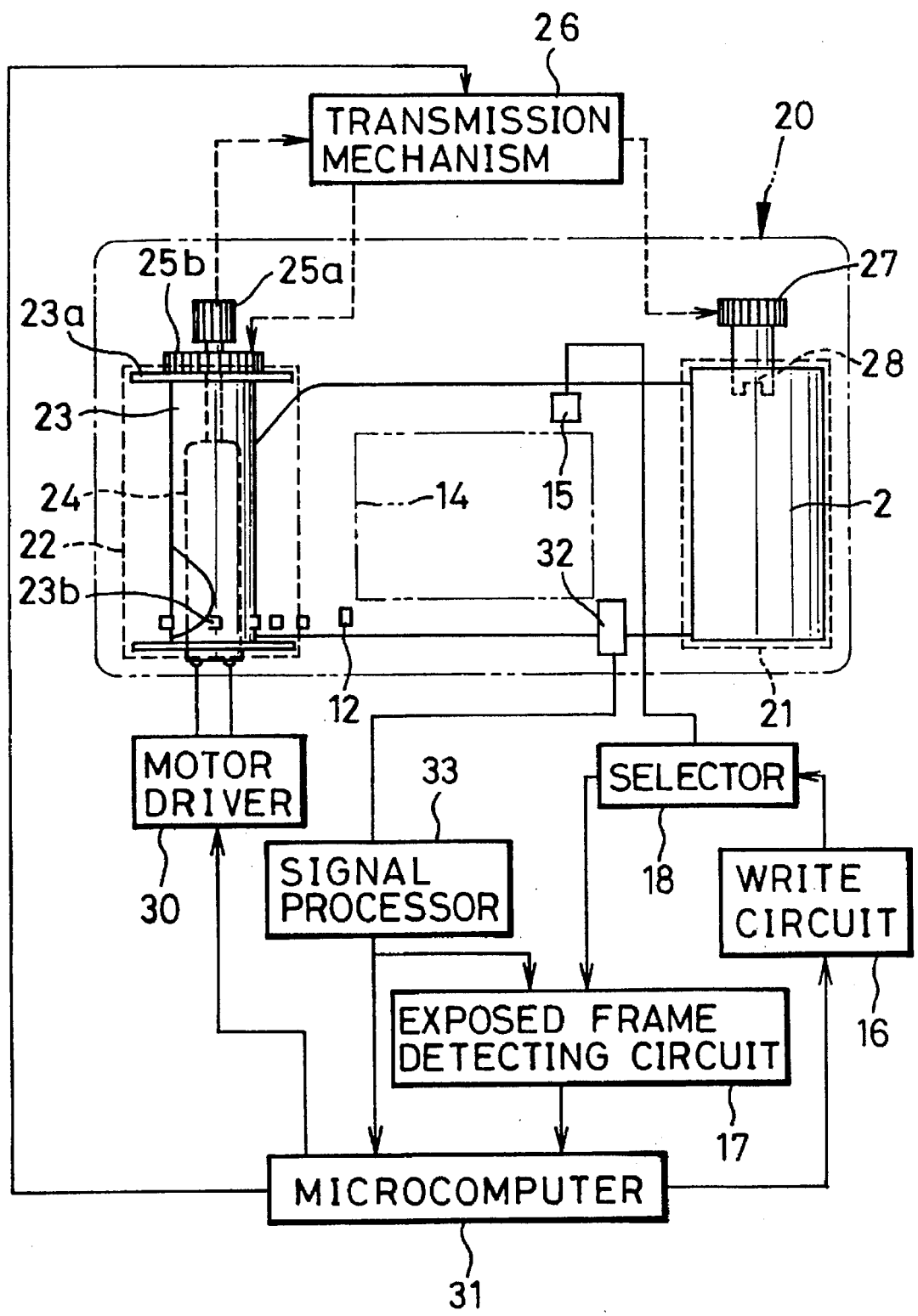
FIG. 4 is a schematic diagram showing an embodiment of a camera according to the present invention.

FIG. 4 is a schematic diagram showing the structure of the camera. The camera 20 has a film supply chamber 21 and a film take-up chamber 22 on opposite sides of the exposure aperture 14. A photographic film cartridge 2 is loaded in the film supply chamber 21. A film take-up spool 23 with a pair of flanges 23a and film driving projections 23b is rotatably mounted in the film take-up chamber 22. The take-up spool 23 accommodates a motor 24 whose rotation power is transmitted via a gear 25a to a transmission mechanism 26.

The transmission mechanism 26 rotates the take-up spool 23 via the gear 25b when the photographic film 5 is wound about the take-up spool 23. For a pre-wind type camera, the transmission mechanism 26 rotates a fork 28 via a gear 27 after one frame has been photographed. This fork 28 is coupled to the film spool 4 of the photographic film cartridge 2 to rotate the spool 4 and rewind the exposed frame about the spool core 4a. After all frames have been photographed, the film spool 4 is rotated continuously for a predetermined time to rewind the film leader 5a into the cartridge 3.

The rotation of the motor 24 is controlled by a microcomputer 31 via a motor driver 30. The perforation 12 at each frame is detected by a perforation sensor 32. A signal from the perforation sensor is processed by a signal processor 33 and is sent to the microcomputer 31 and exposed frame detecting circuit 17. In accordance with a perforation signal from the signal processor 33, the microcomputer 31 controls one frame advance. When a partially used prematurely unloaded photographic film cartridge is reloaded, the microcomputer 31 automatically sets the unexposed frame next to the last exposed frame in the exposure position behind the exposure aperture, in accordance with the exposed frame detecting signal from the exposed frame detecting circuit 17 and the perforation signal. The microcomputer 31 also controls the operation of the selector 18. The circuits depicted outside the camera 20 in FIG. 4 are mounted within the camera 20 in actuality.

Figure 5:
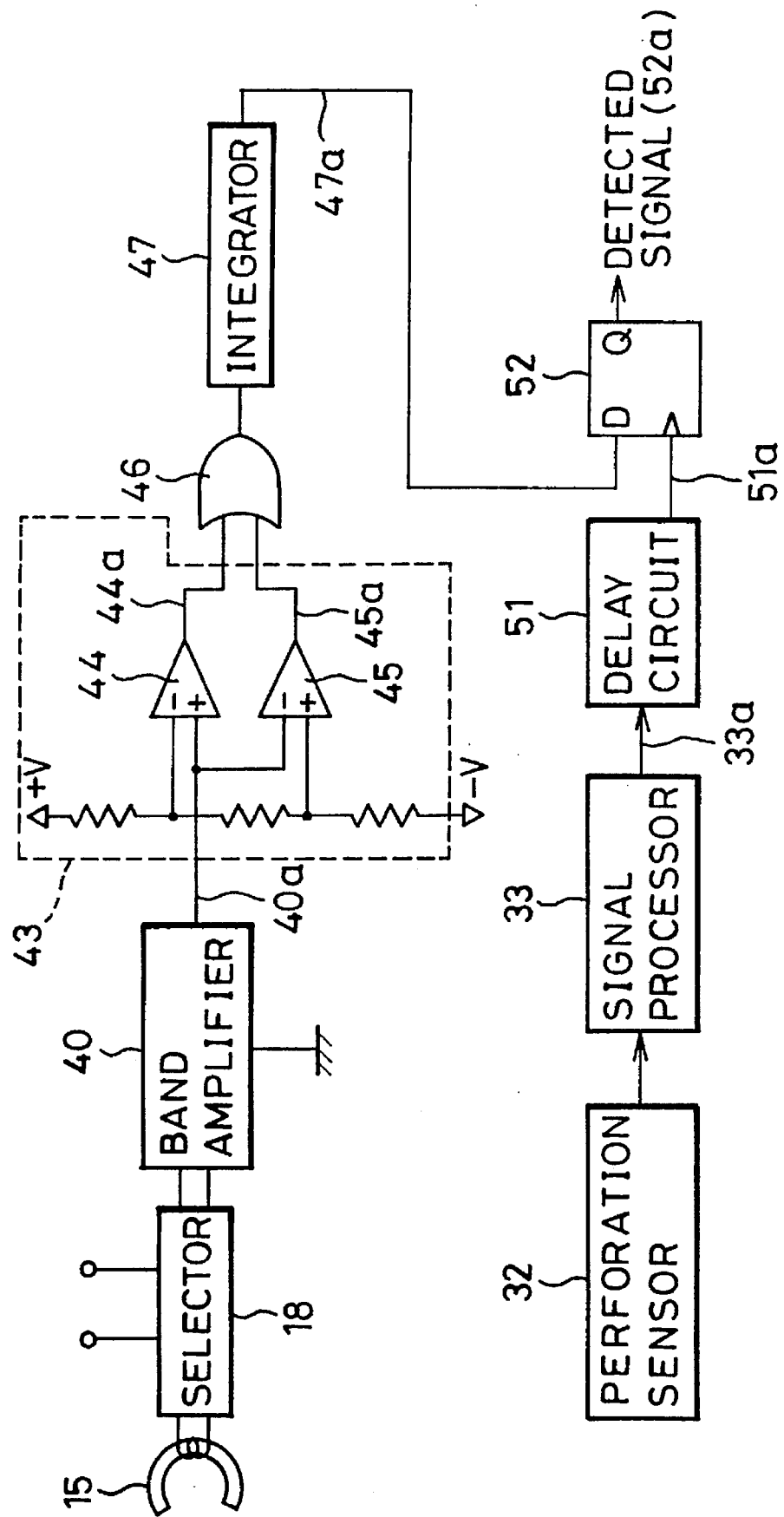
FIG. 5 is a circuit diagram showing an embodiment of an exposed frame detecting circuit.
Figure 6:
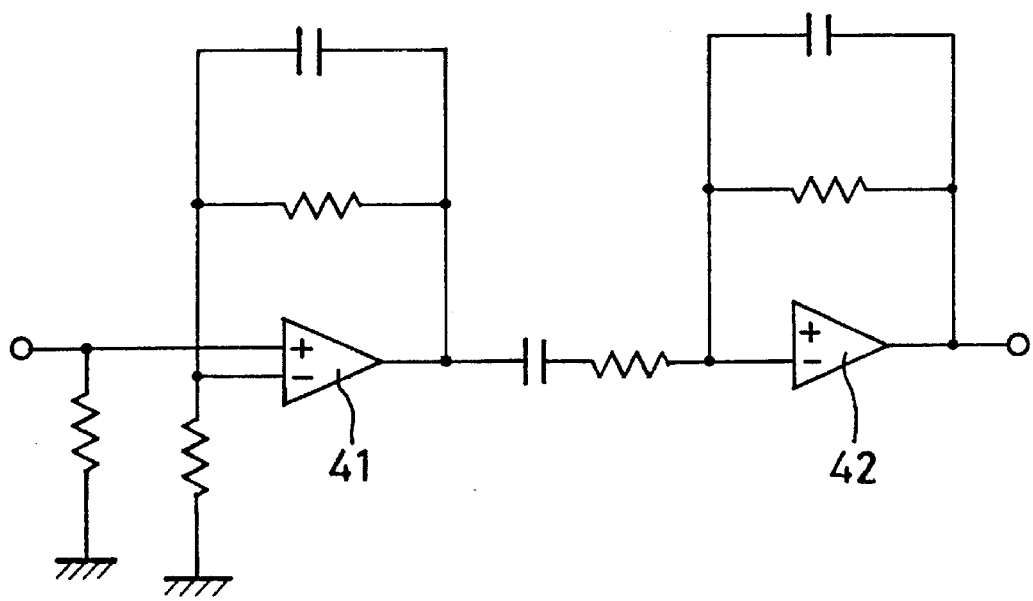
FIG. 6 is a circuit diagram showing an example of a band amplifier.
Figure 7:
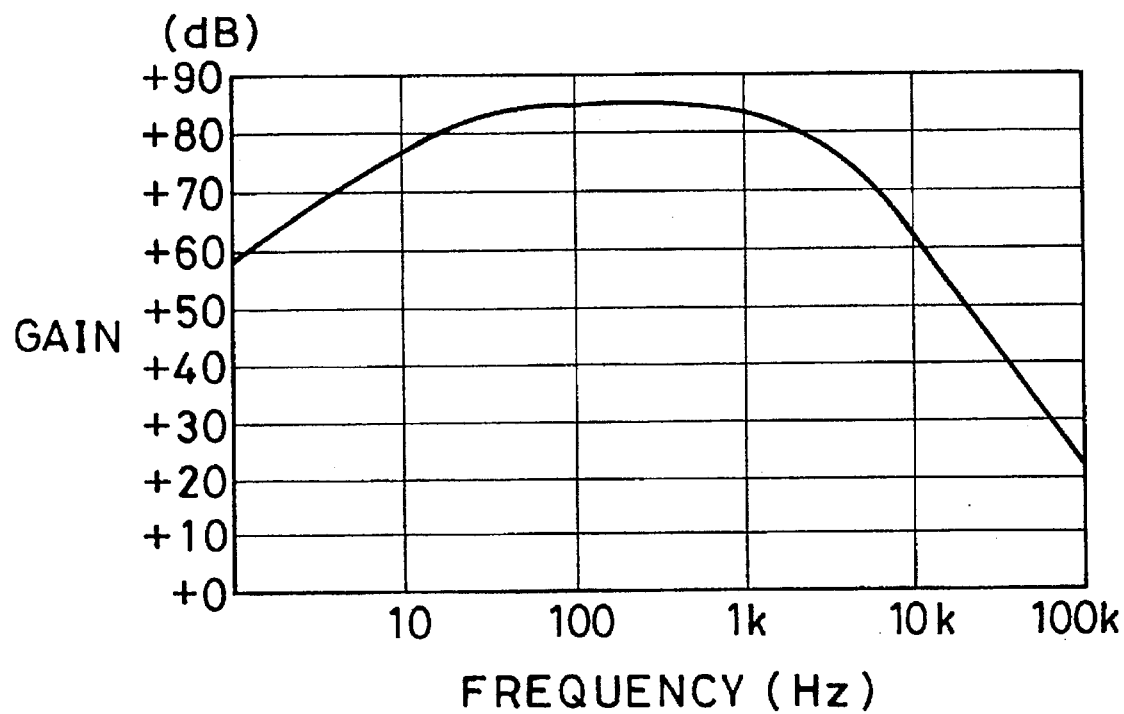
FIG. 7 is a graph showing the frequency characteristics of the band amplifier shown in FIG. 6.

FIG. 5 shows the exposed frame detecting circuit. A signal from the magnetic head 15 is inputted via the selector 18 to a band amplifier 40. The band amplifier 40 is comprised by, for example as shown in FIG. 6, two active filters comprised by two operational amplifiers 41 and 42. The frequency characteristics of the band amplifier 40 are shown in FIG. 7. The frequency characteristics are set such that a change in the speed of advance of the photographic film 5 can be absorbed, and the gain at the frequency bands other than the frequency of recorded information is made low in order to eliminate signals at such other bands as noise.

As shown in FIG. 8, a signal 40a from the band amplifier 40 contains noise components of small amplitude and signal components of large amplitude. A window comparator 43 (FIG. 5) having an upper limit setting threshold value S1 and a lower limit setting threshold value S2 is used, to sample signal components at the threshold value S1 or higher and at the threshold value S2 or lower. Namely, a comparator 44 outputs a signal 44a when the signal 40a has a value at the threshold value S1 or above, and another comparator 45 outputs a signal 45a when the signal 40a has a value at the threshold value S2 or below. These signals 44a and 45a are inputted to an OR gate 46, the output of which is integrated by an integrator 47. If the magnetic head 15 faces the data-recorded magnetic area 13a, the signal 47a has a waveform as shown in FIG. 8 so that it can be judged that the magnetic head 15 is now reading significant information.

In addition to a detection of the data-recorded magnetic area 13a being made, the perforation 12 formed at the start of each frame of the photographic film 5 is photoelectrically detected by the perforation sensor 32. On the basis of the timing of detection of the perforation 12, a signal 47a is sampled. To this end, a signal from the perforation sensor 32 is first processed by the signal processor 33 to shape a signal 33a. This signal 33a is delayed by time T in a delay circuit 51. A delayed signal 51a is inputted as a latch signal to a sampling flip-flop circuit 52, to latch the signal 47a from the integrator 47. The frame having the data-recorded magnetic area 13a is an exposed frame, and for this frame, a signal 52a from the flip-flop circuit 52 has a high level "H".

The reasons why the signal 47a is sampled at a time delayed from the signal 33a is that no information is written at the perforation 12 formed between frames. For a camera of the type in which encode pulses synchronous with the advance of the photographic film 5 are generated by a rotary encoder or the like encode pulses can be counted so that the sampling timing of the signal 47a may be effected when the number of counted encoder pulses reaches a predetermined value.

Figure 9:
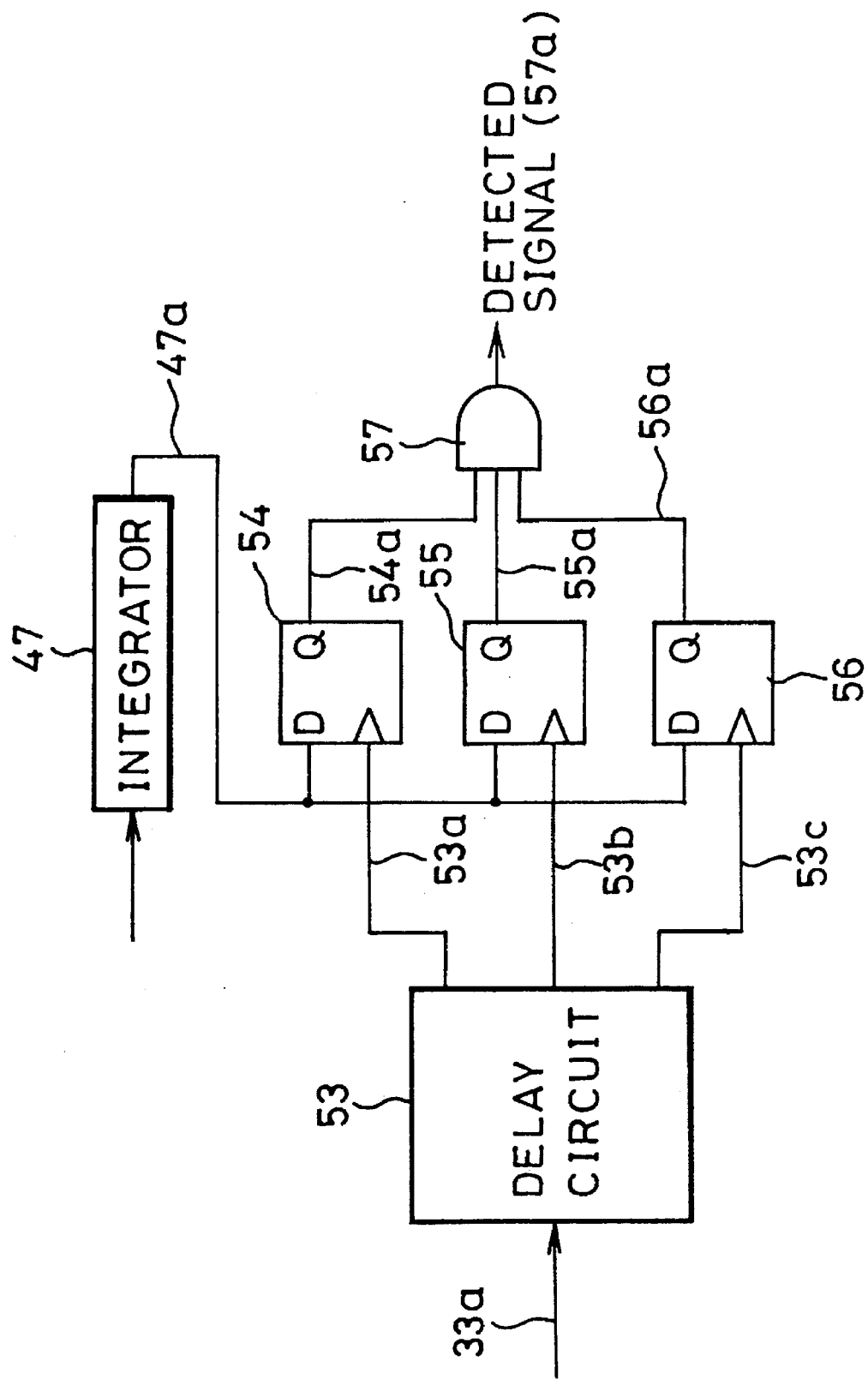
FIG. 9 is a circuit diagram showing an embodiment of a data sampling circuit.
Figure 10:
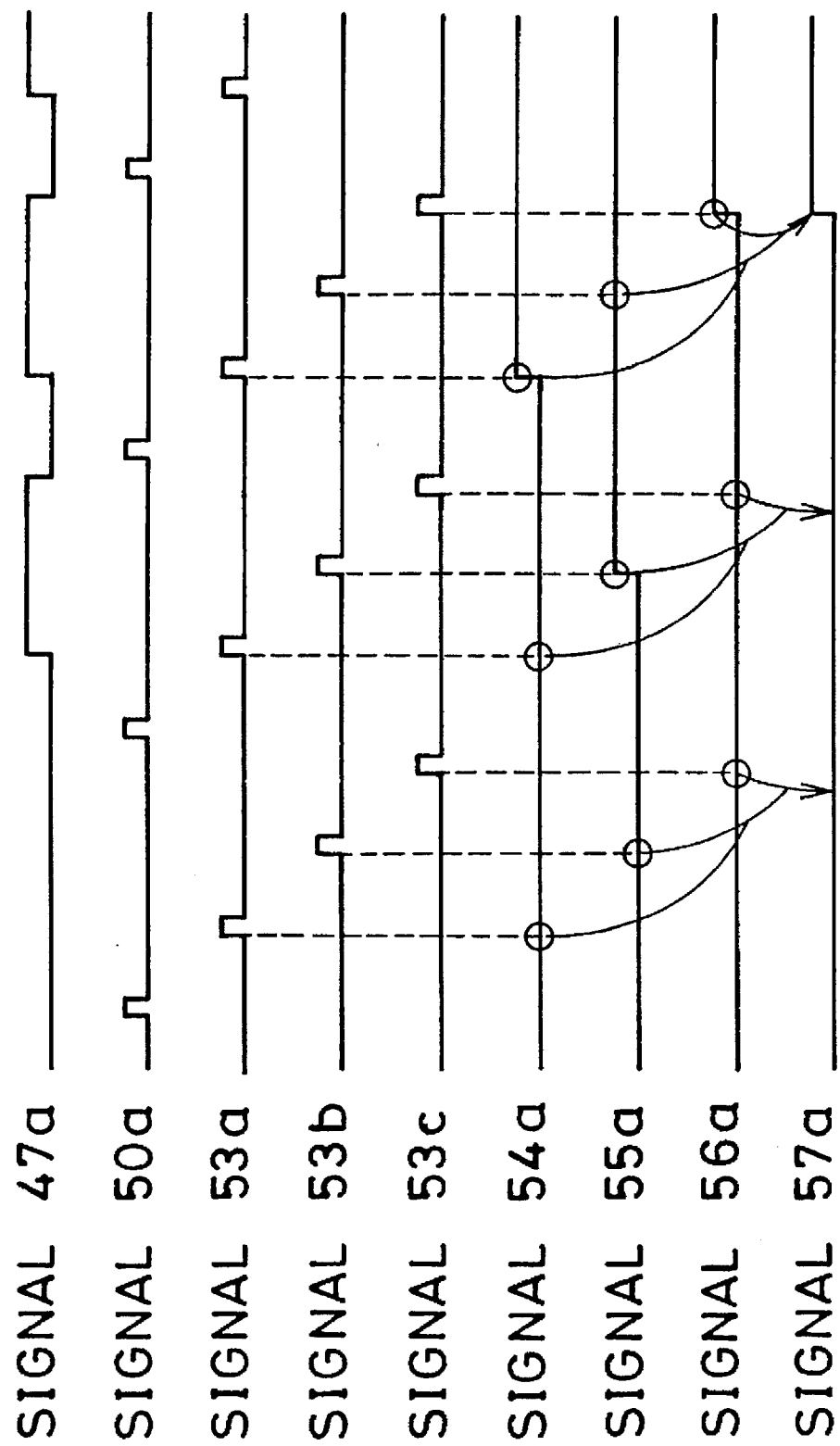
FIG. 10 is a timing chart explaining the operation of the circuit shown in FIG. 9.

The circuit shown in FIG. 9 may also be used for a more reliable judgment. A delay circuit 53 outputs signals 53a, 53b and 53c having different delay times form the inputted signal 33a. As shown in FIG. 10, these signals are supplied as latch signals to flip-flop circuits 54, 55 and 56. Signals 54a, 55a and 56a outputted from the flip-flop circuits 54, 55 and 56 are supplied to an AND gate 57 which generates a logical product of the inputted signals 54a, 55a and 56a. In this manner, a signal representing the presence or absence of a data-recorded magnetic area can be detected more reliably. Instead of the AND gate 57, an OR gate may be used to generate a logical sum of the signals 54a, 55a and 56a. In this case, if one of the signals becomes active, the data-recorded magnetic area 13a can be detected, preventing a detection miss under the low signal level.

Figure 11:
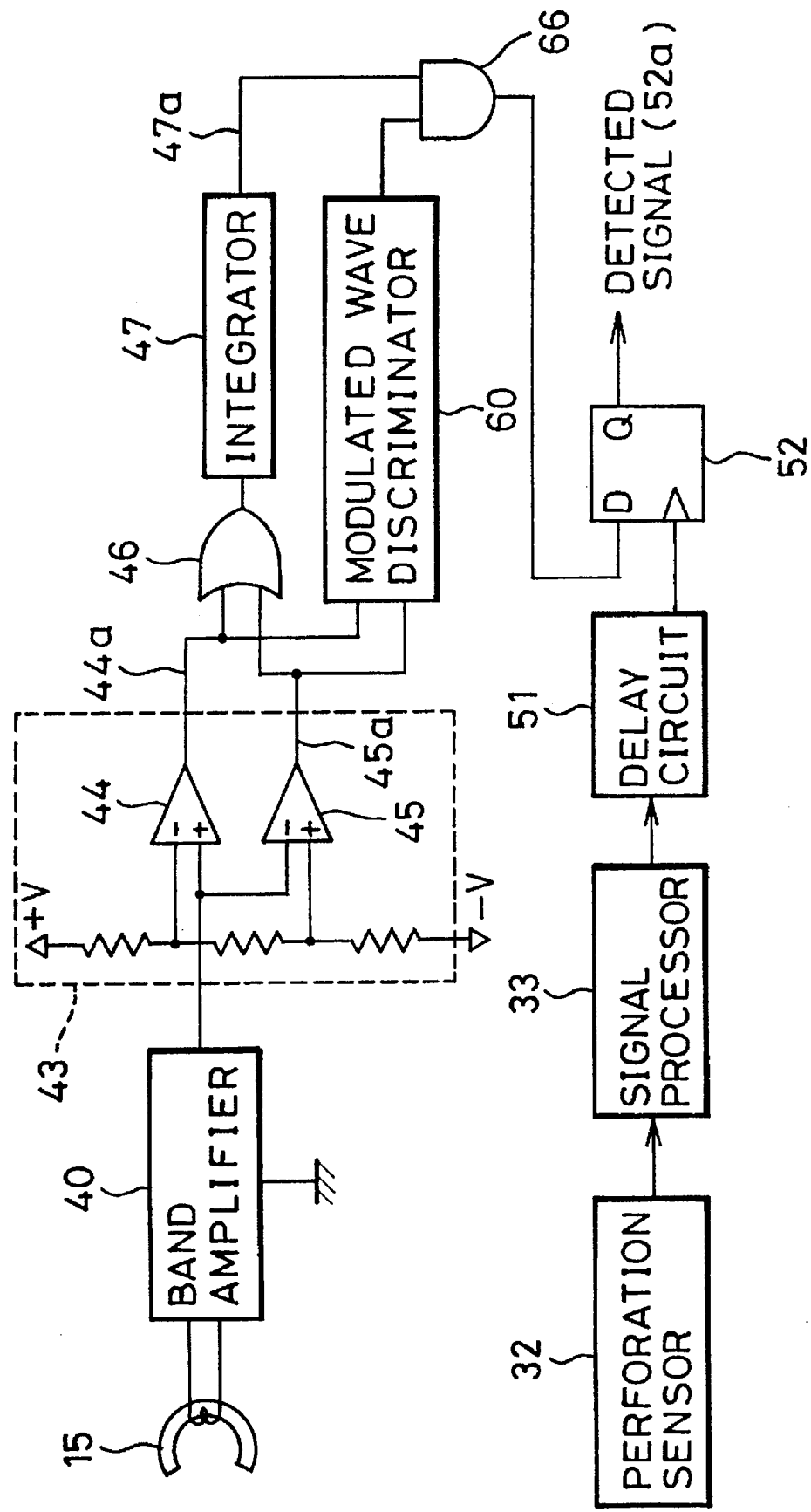
FIG. 11 is a circuit diagram of an exposed frame detecting circuit having a modulated wave discriminator.
Figure 12:
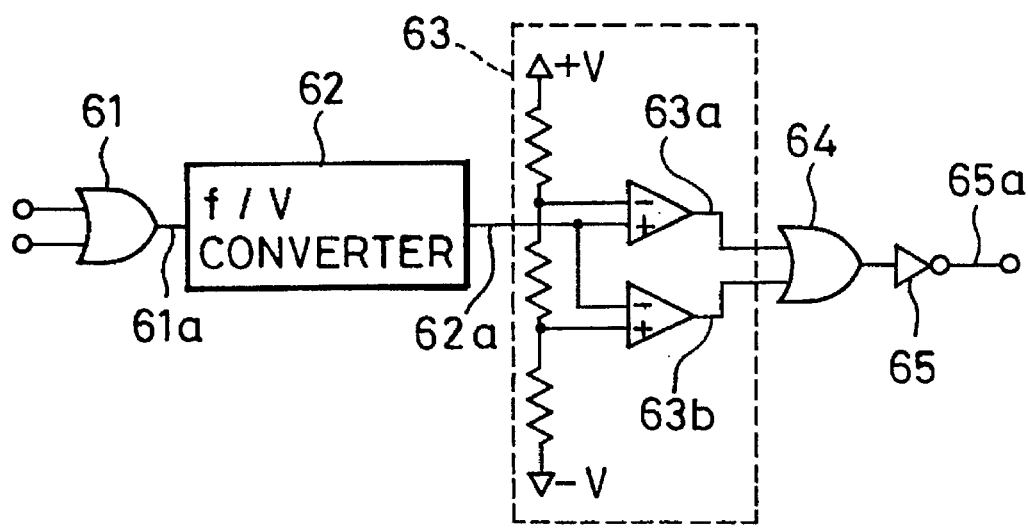
FIG. 12 is a circuit diagram showing an example of the modulated wave discriminator.
Figure 13:
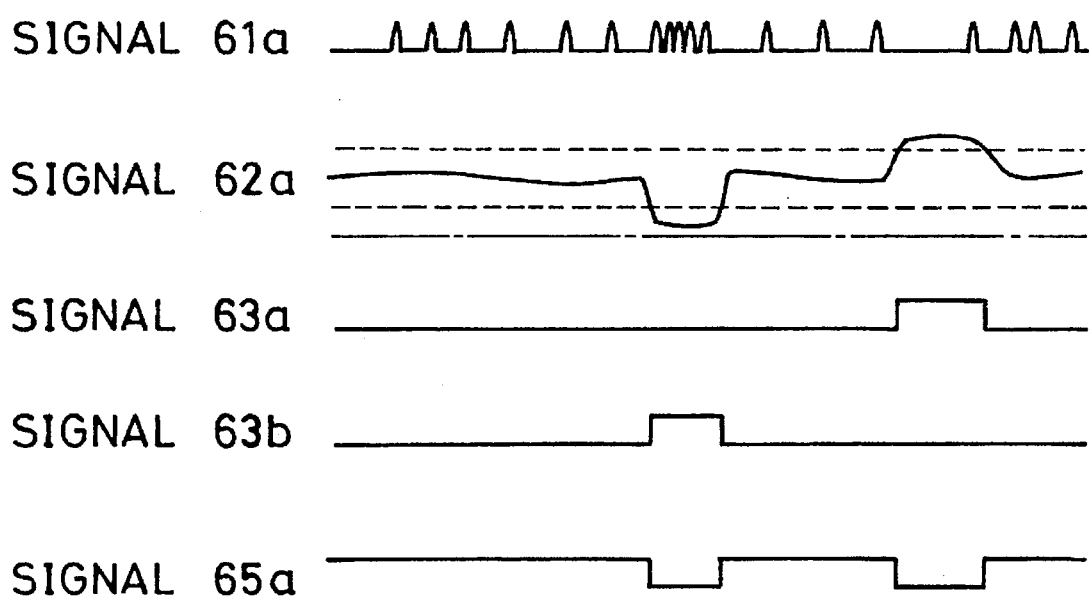
FIG. 13 is a timing chart explaining the operation of the circuit shown in FIG. 12.

In the above embodiment, if noises not eliminated by the band amplifier 40 are superposed on the signal from the magnetic head 15, these noises might exceed the threshold values of the window comparator 43, and might be detected as the signal components. To avoid such a case, a modulated wave discriminator 60 as shown in FIG. 11 is preferably used. In FIG. 11, circuit elements similar to those shown in FIG. 5 are represented by identical reference numerals. Information recorded on the data-recorded magnetic area 13a is covered over a certain frequency band. Signals having a frequency greatly different from this frequency band are discarded as noise. As shown in FIG. 12, the modulated wave discriminator 60 is comprised by an OR gate 61 to which signals 44a and 45a from the window comparator 43 are inputted, an f/V converter 62, a window comparator 63, an OR gate 64, and an inverter 65. Waveforms for various circuit portions are shown in FIG. 13.

The f/V converter 62 outputs a voltage signal 62a corresponding to the frequency of a signal 61 a from the OR gate 61. The level of this signal 62a is detected by the window comparator 63, and if the level is not in the range between predetermined upper and lower limits, the window comparator 63 outputs signals 63a and 63b of "H" level. The upper and lower limits of the window comparator 63 are determined by the voltage levels corresponding to the frequency band of information recorded signals. As a result, the frequency of a combined signal of the signals 44a and 45a from the window comparator 43 greatly different from the frequency band of information recorded signals can be discriminated.

A signal from the OR gate 64 is inverted by the inverter 65. An output signal 65a from the inverter 65 and the signal 47a from the integrator 47 are inputted to an AND gate 66 shown in FIG. 11. It is therefore possible to detect the data-recorded magnetic area 13a while suppressing the influence of noise. The upper and lower limits of the window comparator 63 may not be fixed, but they may be varied with the speed of advance of the photographic film 5, allowing a more accurate judgment.

Figure 14:
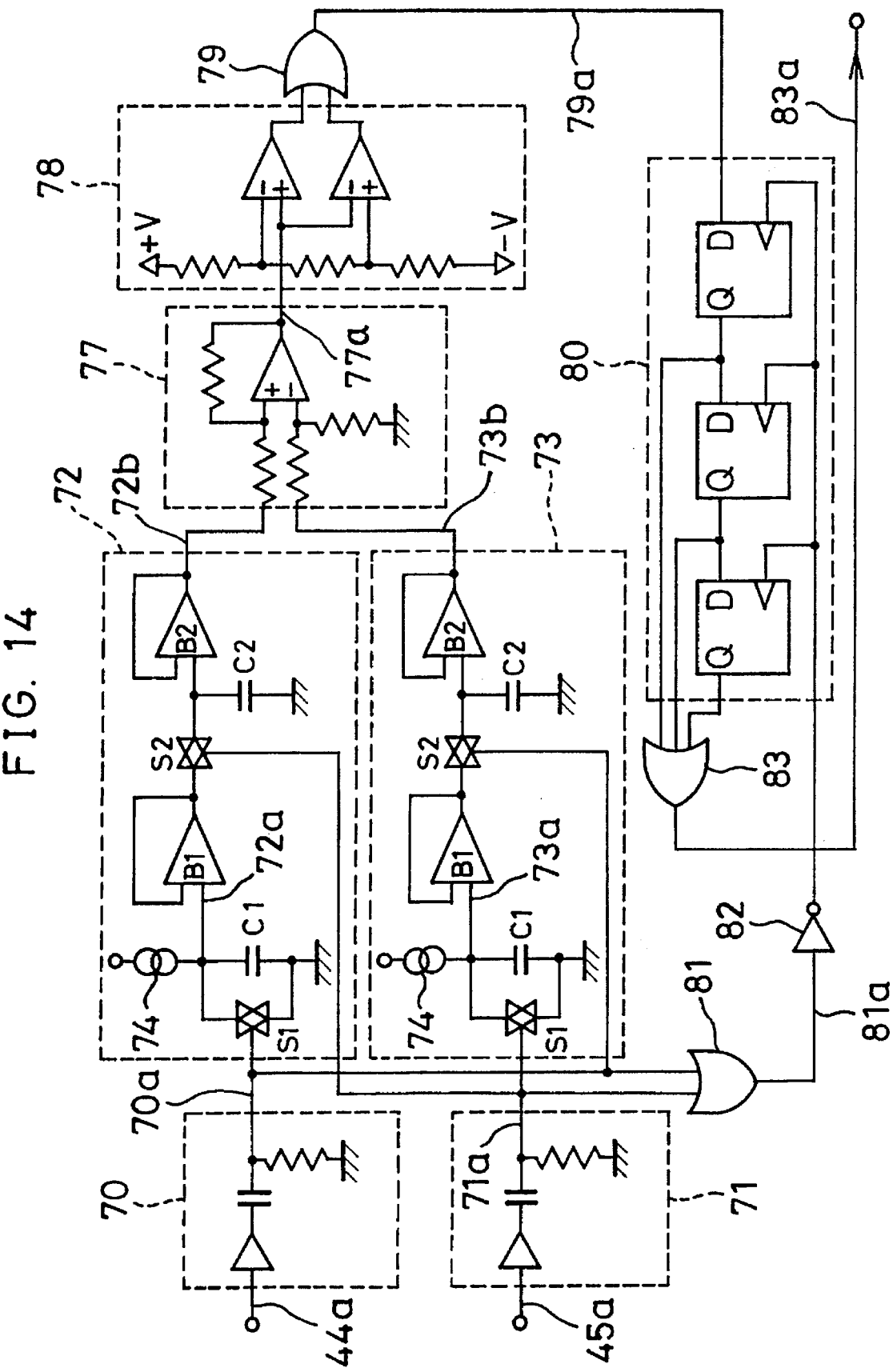
FIG. 14 is a circuit diagram showing another example of the modulated wave discriminator.

FIG. 14 shows another example of the modulated wave discriminator. This modulated wave discriminator is suitable for discriminating the data-recorded magnetic area 13a adapted to magnetic recording with a three-bit code system. As shown in FIGS. 15A and 15B, with the three-bit code system, "1" and "0" represented by whether the inversion between S and N poles takes place at the "one third" area or at the "two thirds" area of the unit record length L of one bit divided into three areas. Therefore, with this system, there cannot normally be any occasion of equality of three or more intervals between positive or negative pulses upon polarity inversion.

Noise has generally the same pulse interval as viewed for a short time in the order of two periods or so. Also the film advance speed can be considered sufficiently constant as viewed for a short time, although it continuously changes. Taking into consideration the characteristic feature of the three-bit code system described above, it is possible to judge whether the signal read from the magnetic head 15 is part of the three-bit code, or whether it is part of other signals.

FIG. 16 shows waveforms at various points of the circuit shown in FIG. 14. The signals 44a and 45a from the window comparator 43 shown in FIG. 5 are inputted to differentiators 70 and 71 in FIG. 14 to detect the rising edges of the inputted signals. The differential pulses 70a and 71a thus obtained are inputted to respective t/V converters 72 and 73. The t/V converters 72 and 73 have the same circuit structure, and each is comprised by a pair of switches S1 and S2, capacitors C1 and C2, and buffer amplifiers B1 and B2.

The switch S1 is closed for a short time by the differential pulse 70a. The capacitor C1 is discharged to 0 V, and after the switch S1 is opened, starts charging from a constant current source 74. The voltage across the capacitor C1 rises in proportion to the lapsed time. The switch S2 is closed for a short time by the differential pulse 71a so that the voltage across the capacitor C1 is transferred via the buffer amplifier B1 to the capacitor C2. Therefore, the voltage across the capacitor C2 takes a value proportional to the lapsed time from the input of the differential pulse 70a to the input of the differential pulse 71a. This voltage remains constant after the switch S2 is opened, and is outputted from the buffer amplifier B2 as a voltage signal 72b. The other t/V converter 73 operates in the same manner, and outputs a voltage signal 73b proportional to the lapsed time from the input of the differential pulse 71a to the input of the differential pulse 70a. Referenced by 72a and 73a are voltage signals of the capacitors C1.

Equality of the voltage signals 72b and 73b generally represents equality of the previous two successive intervals between pulses. By passing the voltage signals 72b and 73b through a differential amplifier 77, a window comparator 78, and an OR gate 79, a signal 79a can be obtained which has an "L" level when the two successive intervals of pulses are the same. This signal 79a is inputted to a three-bit shift register 80. Shift pulses supplied to the shift register 80 are obtained from an inverter 82 which inverts a logical sum of the differential pulses 70a and 71a supplied to an OR gate 81. Shift pulses are therefore rear edges of the logical sum of the differential pulses 70a and 71a.

If the interval between differential pulses 70a and 71a becomes the same three times in succession, each bit of the shift register 80 becomes "0" which is detected by an OR gate 83. In this manner, it is possible to obtain an inhibit signal 83a having an "L" level when an abnormal signal is detected, thereby judging that the signal from the magnetic head 15 is not a signal written according to three-bit codes, but rather is noise. By inputting the inhibit signal 83a to one input terminal of the AND gate 66 shown in FIG. 11, the data-recorded magnetic area 13a can be detected without any error.

Figure 17:
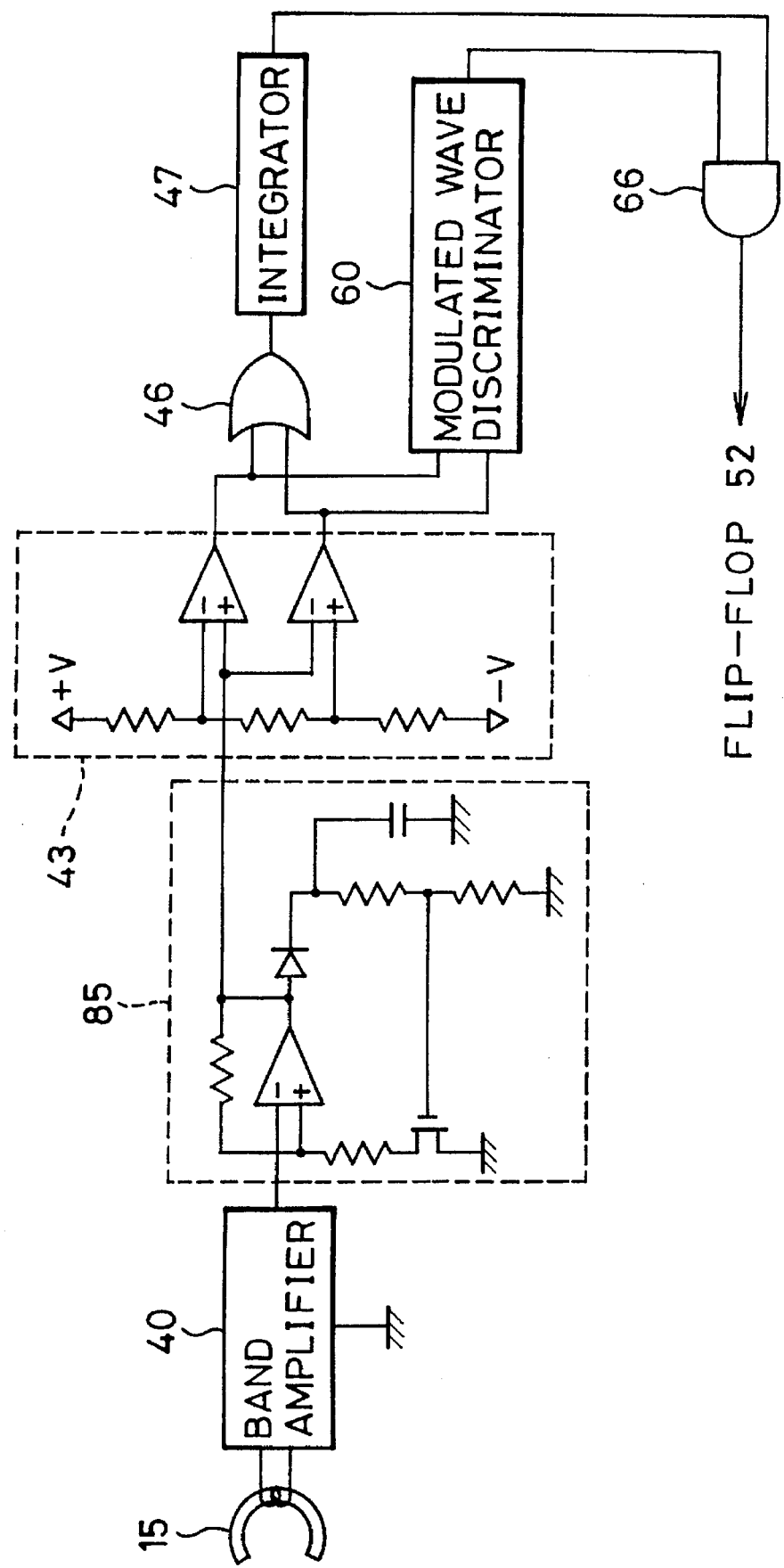
FIG. 17 is a circuit diagram of an exposed frame detecting circuit having an AGC circuit.

In the case of a low-cost camera as compared to a high-quality camera, the film advance speed is likely to vary irregularly and the contact state between the magnetic head 15 and magnetic recording layer 13 is likely to change or become misaligned. As a result, an output signal from the magnetic head 15 will likely change its level. In such a case, an automatic gain control (AGC) circuit for stabilizing the level of an inputted signal can be used. However, a simple use of the AGC circuit could amplify even noise to a predetermined level if operating under a low signal-to-noise ratio. To deal with this, as shown in FIG. 17, the AGC circuit 85 is used in combination with the modulated wave discriminator 60 shown in FIG. 11.

Figure 18:
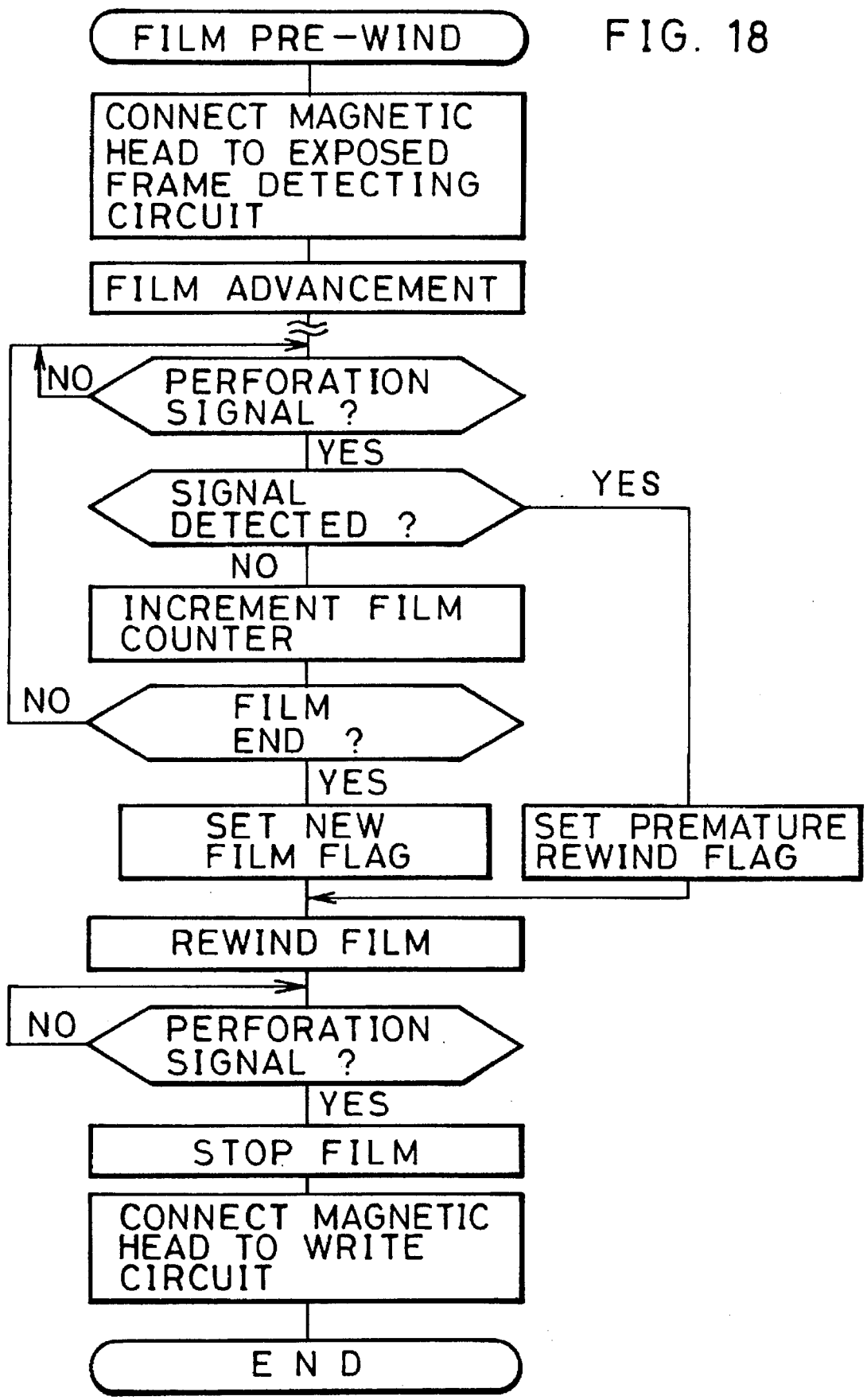
FIG. 18 is a flow chart explaining the procedure of setting the unexposed frame next to the last exposed frame in the exposure position, for a pre-wind type camera.

FIG. 18 is a flow chart showing the film advance operation when a photographic film cartridge is reloaded in a pre-wind type camera. If a photographic film cartridge 2 is to be taken out of the camera prematurely, namely in the course of use of the film, then a rewind button (not shown) mounted on the camera 20 is depressed. Upon the depression of this button, the motor 24 rotates in the reverse direction to rotate the fork 28 via the transmission mechanism 26 so that the film spool 4 of the photographic film cartridge 2 rotates. The film spool 4 rewinds the photographic film 5 with unexposed frames wound outermost about the take-up spool 23. When a predetermined time lapses after the last perforation 12 is detected by the perforation sensor 32, the microcomputer 31 stops the motor 24. At this time, the film leader 5a has been fully rewound into the cartridge 3 as shown in FIG. 2. The photographic film cartridge 2 containing the photographic film 5 with unexposed flames can be taken out of the camera by opening the rear door.

To reload the photographic film 5 with unexposed frames, the photographic film cartridge 2 is inserted in the film supply chamber 21 after opening the rear door. At the time the photographic film cartridge 2 is loaded, the magnetic head 15 is connected by the selector 18 to the exposed frame detecting circuit 17. When the rear door is closed, the microcomputer 31 rotates the motor 24 in the normal direction to advance the film. The rotation of the motor 24 is transmitted via the transmission mechanism 26 to the film spool 4 and take-up spool 23. As the film spool 4 rotates, the film roll rotates so that the film leader 5a is separated by the separation claw 7b from the film roll and advanced through the film passage 8 to the outside of the cartridge 3.

The film leader 5a is advanced along the exposure aperture 14 into the film take-up chamber 22. Because the take-up spool 23 rotates within the film take-up chamber 22, perforations formed densely in the film leader 5a engage with the film-driving projections 23b so that the film leader 5a is captured by the take-up spool 23. Thereafter, the film spool 4 and fork 28 rotate with the photographic film 5 by means of slip clutch, because the film advance speed of the take-up spool 23 is greater than that of the film spool 4.

When the photographic film 5 is advanced form the cartridge 3 and wound about the take-up spool 23, the magnetic head 15 in sliding contact with the magnetic recording layer 13 detects the date-recorded magnetic areas 13a. The perforation sensor 32 on the other hand detects the perforations 12 of the photographic film 5. In the pre-wind type camera, photography starts from a film portion adjacent the film leader. Therefore, only unexposed frames are present at the initial stage of prewinding, and so the detecting signal 52a is not generated.

As pre-winding progresses, the magnetic head 15 eventually detects the recorded magnetic area 13a and generates a detection signal 52a. At this time, the microcomputer 31 sets a premature rewind flag and rotates the motor 24 in the reverse direction to start rewinding the photographic film 5 into the cartridge 3. When the perforation sensor 32 detects a perforation 12 during this rewinding, the microcomputer 31 stops the motor 24. As a result, the unexposed frame next to the last exposed frame marked by the date-recorded magnetic area 13a is set in the exposure position. The microcomputer 31 causes the selector 31 to connect the magnetic head 15 to the write circuit 16. Thereafter, because the premature rewind flag is set, the photographic film 5 is wound back into the cartridge 3 each time one frame is exposed. During each one-frame advance, the magnetic head 15 records information on the magnetic recording layer 13 to form the data-recorded magnetic area 13a for the exposed frame.

If the detection signal for the exposed frame is not generated, it means that an unused photographic film cartridge was loaded. In this case, the photographic film 5 is pulled out beginning with the film trailer. After the photographic film 5 has been completely pulled out, a new film flag is set. In this case, ordinary photography is performed to rewind one frame of the photographic film 1 into the cartridge 3 each time one frame is exposed. Also in this case, during the one-frame advance, the magnetic head 15 writes data supplied from the write circuit 16 on the magnetic recording layer 3 in the area corresponding to the exposed frame.

Figure 19:
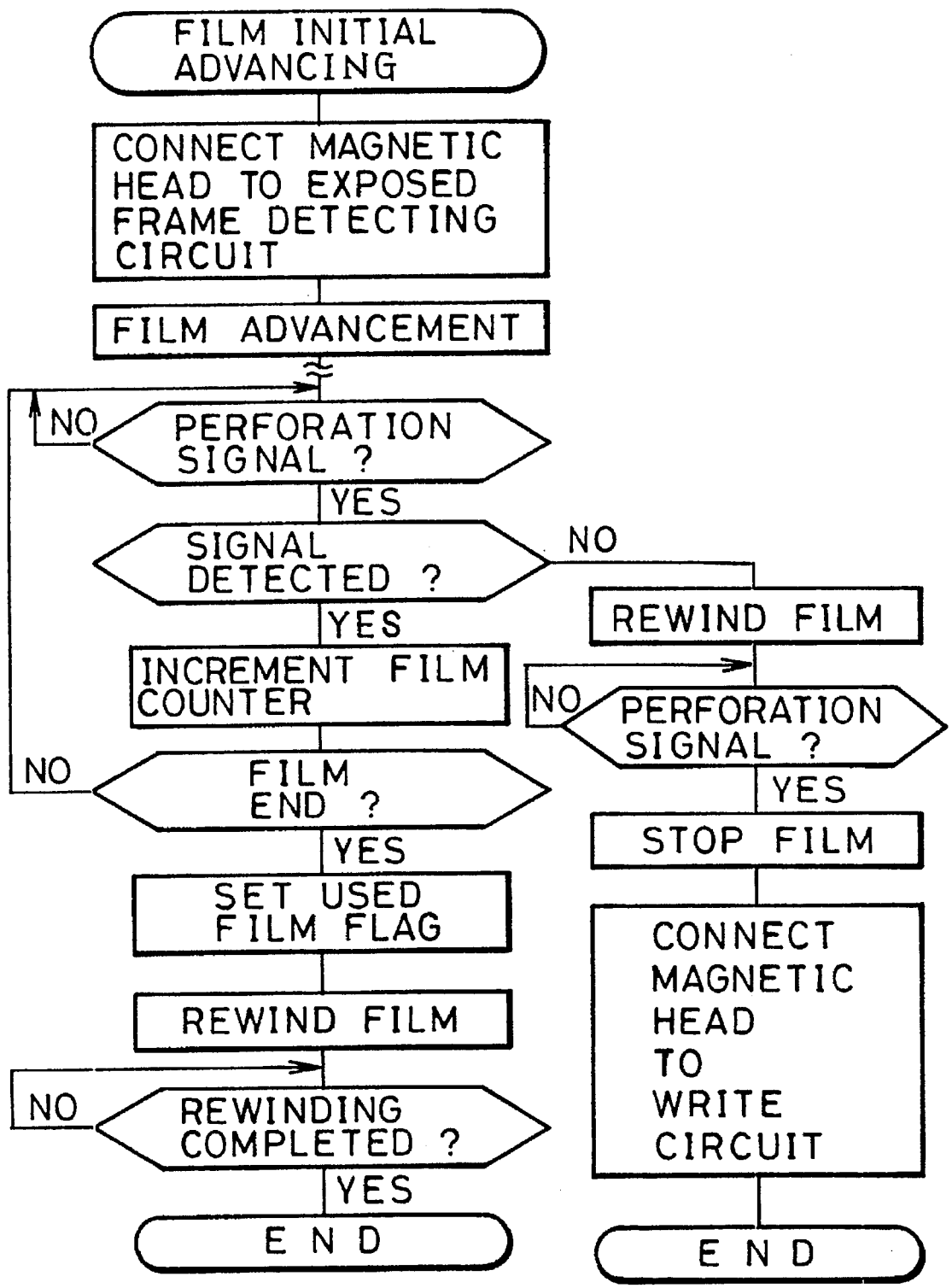
FIG. 19 is a flow chart explaining the procedure of setting the unexposed frame next to the last exposed frame in the exposure position, for an ordinary wind type camera.

FIG. 19 is a flow chart showing the film advance operation when the invention is applied to an ordinary wind type camera. When a photographic film cartridge 2 is loaded, the magnetic head 15 is connected to the exposed frame detecting circuit 17. Thereafter, the microcomputer 31 rotates the motor 24 in the normal direction to rotate the take-up spool 23 and film spool 4. As described previously, the film leader 5a is advanced from the cartridge 3 and captured by the take-up spool 23. While the photographic film 5 is wound about the take-up spool 23, the detecting signal 52a is generated.

If the photographic film 5 in the cartridge 3 has unexposed frames, first the detection signal 52a is generated at a predetermined time interval. When the perforation detection signal is generated after the detection signal 52a could not be generated, it can judged that one unexposed frame was advanced. At this time, the motor 24 is rotated in the reverse direction to rewind the photographic film 5 by one frame and to set the unexposed frame next to the last exposed frame in the exposure position. Thereafter, the selector 18 connects the magnetic head 25 to the write circuit 16 to record photographic information for each frame.

In this embodiment, the unexposed frame is discriminated when only the perforation signal is detected. There is a possibility of an erroneous judgment of the unexposed frame when detecting five or so perforations formed densely in the film leader 5a to be captured by the take-up spool. To avoid this, the period or number of signals from the perforation sensor may be detected so as to discard signals of detection of such engaging perforations.

In the case of an unused photographic film cartridge, the exposed frame detection signal is not generated but the perforation of the first frame is detected at first. In this case, the motor 24 is rotated in the reverse direction to rewind one frame and to set the first frame in the exposure position. In the case of a cartridge with all frames exposed, the film winding continues to pull out almost all the photographic film roll from the cartridge 3. When it is detected from the film counter that all frames have been wound, a used film flag is set and the motor 24 is rotated in the reverse direction to rewind the photographic film 5 into the cartridge 3.

The magnetic head may be used for recording only the information representing the existence of an exposed frame, without recording further information. In this case, an alternating current signal is supplied to the magnetic head, simplifying the circuit. Furthermore, the present invention is applicable to a conventional photographic film cartridge unable to advance the film leader by spool rotation. In this case, the film rewinding is stopped when one or two centimeters of the film leader remain outside the cartridge so as to allow a manual advance of the film roll when reloading it. Furthermore, instead of the perforation sensor, a film encoder may be used which rotates with the photographic film and generates pulses.

Although the present invention has been described with reference to preferred embodiments shown in the drawings, the invention is not limited by these embodiments but, on the contrary, various modifications, changes, combinations and the like of the present invention can be effected without departing from the spirit and scope of the appended claims.

What is claimed is:

1. A camera to be used with a photographic film cartridge, said photographic film cartridge having a film spool for winding a photographic film in the cartridge, said photographic film being formed with a magnetic recording layer having an area for each frame on which information is adapted to be written, said camera comprising:

a film supply chamber in which said photographic film cartridge is loaded;

a film take-up chamber for winding said photographic film in said photographic film cartridge about a take-up spool rotatably mounted in said film take-up chamber;

means defining an exposure position disposed between said film supply chamber and said film take-up chamber, whereby frames of said photographic film can be successively exposed in said exposure position;

film moving means for moving said photographic film lengthwise between said cartridge and said take-up spool, said film moving means comprising power means to rotate said film spool in a direction to push said photographic film out of said cartridge;

a magnetic head for contacting said magnetic recording layer and for detecting a mere presence of said information without reading said information, while said photographic film is moving lengthwise;

judging means for inspecting a signal from said magnetic head, judging a frame to have been exposed when the mere presence of said information is detected, and generating a first signal;

a film sensor for generating a second signal when said photographic film is transported by one frame, and control means for detecting a next-usable unexposed frame beside a last exposed frame responsive to the generation of said first and said second signals and for controlling said film moving means to position said next-usable unexposed frame in said exposure position; and wherein said judging means includes a band amplifier for amplifying a signal component within a specific wavelength band from a signal from said magnetic head, a window comparator for generating a signal when a signal from said band amplifier exceeds a predetermined signal level range, an integrator for integrating a signal from said window comparator, a delay circuit for delaying a signal from said film sensor, and a flip-flop for sampling an output of said integrator at the time of a signal from said delay circuit.

2. A camera according to claim 1, wherein said film has a film leader which is fully located within said cartridge before said film is used and is advanced out of said cartridge when said film spool is rotated in an unwinding direction.

3. A camera according to claim 1, wherein said photographic film has one perforation per one frame, and said film sensor photoelectrically detects said perforation and generates said second signal.

4. A camera according to claim 3, further comprising a write circuit, and a selector circuit for selectively connecting said magnetic head to one of said write circuit and said judging means, wherein, while said photographic film is moved lengthwise after a frame is exposed, said magnetic head is connected to said write circuit and writes said information on said area of said magnetic recording layer corresponding to said exposed frame.

5. A camera according to claim 1, wherein said judging means further includes a modulated wave discriminator for checking the frequency of a signal from said window comparator and invalidating a signal from said integrator if said frequency is above a predetermined maximum or below a predetermined minimum.

6. A camera according to claim 1, wherein said information recorded on said magnetic recording layer is represented as a plurality of bits, each of said bits being divided into three areas, each said area being capable of being set to a magnetic polarity or left in an initial state.

7. A camera according to claim 1, wherein said control means controls said film moving means such that said unexposed photographic film is pulled out of said cartridge and wound about said take-up spool, and each time a frame is exposed, said photographic film is rewound by one frame back into said cartridge.

8. A camera according to claim 7, wherein said control means controls said film moving means, after said photographic film cartridge is inserted in said film supply chamber, in such fashion as:

to rotate said film moving means in a first direction to wind about said take-up spool said photographic film pulled out of said cartridge;

when said first signal is received from said judging means, to rotate said film transporting means in a second direction opposite said first direction to rewind said photographic film back into said cartridge; and when said second signal is received from said film sensor during said rewinding, to stop said film moving means thereby to locate said next-usable unexposed frame in said exposure position.

9. A camera according to claim 1, wherein said control means controls said film moving means such that each time a frame is exposed, said photographic film is pulled out of said cartridge by one frame and wound about said take-up spool.

10. A camera according to claim 1, wherein said control means controls said film moving means, after said photographic film cartridge is inserted in said film supply chamber, in such fashion as:

to rotate said film moving means in a first direction to wind about said take-up spool said photographic film pulled out of said cartridge; and when said second signal is received from said film sensor after the end of the generation of said first signal from said judging means, to stop said film moving means thereby to locate said next-usable unexposed frame in said exposure position.

* * * * *